US012783574B2

(12) United States Patent
Anand et al.

(10) Patent No.: US 12,783,574 B2
(45) Date of Patent: Nov. 3, 2026

(54) IMAGE OPTIMIZATION

(71) Applicant: BOLD Limited, Hamilton (BM)

(72) Inventors: Baroon Anand, New Delhi (IN); Meenakshi Kumar, Noida (IN); Rajan Garg, Ghaziabad (IN); Mohit Jindal, Noida (IN)

(73) Assignee: BOLD Limited, Hamilton (BM)

( * ) Notice: Subject to any disclaimer, the term of this patent is extended or adjusted under 35 U.S.C. 154(b) by 0 days.

(21) Appl. No.: 19/174,769

(22) Filed: Apr. 9, 2025

(65) Prior Publication Data

US 2026/0320110 A1 Oct. 15, 2026

(51) Int. Cl.

| | |
|---|---|
| ***G06F 16/00*** | (2019.01) |
| ***G06F 9/54*** | (2006.01) |
| ***G06F 16/25*** | (2019.01) |
| ***G06F 16/51*** | (2019.01) |
| ***G06F 16/535*** | (2019.01) |
| ***G06T 3/40*** | (2006.01) |

(52) U.S. Cl.
CPC ............ *G06F 16/535* (2019.01); *G06F 9/547* (2013.01); *G06F 16/258* (2019.01); *G06F 16/51* (2019.01); *G06T 3/40* (2013.01)

(58) Field of Classification Search
CPC ....... G06F 16/51; G06F 16/258; G06F 16/535
USPC .......................................................... 707/756
See application file for complete search history.

(56) References Cited

U.S. PATENT DOCUMENTS

2013/0097170 A1* 4/2013 Flanagan ............... G01V 1/302 709/213
2014/0187239 A1* 7/2014 Friend ..................... H04L 69/18 455/426.1
2017/0006349 A1* 1/2017 Song ....................... G06T 11/60
2022/0188266 A1* 6/2022 Shiell .................... G06F 16/148
2025/0272244 A1* 8/2025 Antonyraj ........... G06F 12/0891

* cited by examiner

*Primary Examiner* — Ann J Lo
*Assistant Examiner* — Rezwanul Mahmood
(74) *Attorney, Agent, or Firm* — Dinsmore & Shohl LLP

(57) ABSTRACT

Certain aspects provide techniques for image optimization. A method includes receiving a first request for an image, wherein the first request comprises a cache key for the image; determining that the image corresponding to the cache key is not in the data storage; retrieving an original image of the image indicated by the first request; sending a first response to the first request, wherein the first response comprises an interim image and an image expiration time; converting the original image to an optimized image, wherein the optimized image comprises a format and dimensions corresponding to the image URL and the header of the cache key; receiving, via the API at a time after the image expiration time, a second request for the image; querying the data storage for the image based on the cache key of the second request; and sending a second response that comprises the optimized image.

20 Claims, 6 Drawing Sheets

IMAGE OPTIMIZATION

TECHNICAL FIELD

Aspects of the present disclosure relate to image optimization techniques.

BACKGROUND

Webpages are electronic documents that can viewed using a web browser. Webpages are usually designed in HyperText Markup Language (HTML), which may reference related files for graphics and scripts. To view a webpage, a Universal Resource Locator (URL) is entered into the address bar of a browser. The browser then requests the webpage file from the server associated with the URL. The process of loading a webpage typically begins with the HTML document being requested and received by a computing device from one or more servers configured to provide the HTML document to a browser implemented by the computing device. The browser may then parse the HTML document to identify linked resources, such as Cascading Style Sheets (CSS) and JavaScript files. The linked resources can be downloaded in parallel, allowing the browser to start rendering the page as the HTML document continues to be parsed so that elements of the webpage, such as layout, text, images, and the like can begin appearing as soon as possible. Images and other media assets of the webpage are typically loaded near the end of the webpage loading process because of a process referred to as "lazy loading" which permits bandwidth to be allocated to loading essential content, such as text, headings, and frames, before loading images and other media assets. Accordingly, webpages can appear incomplete until the multimedia content loads.

In some cases, webpages are configured to use low resolution placeholders for multimedia content, such as images and other media, until the multimedia content finishes loading to reduce the perceived loading time. Further, depending on the device the webpage is being accessed through, or the browser that is hosting the webpage, the format and/or resolution of images may need to be optimized before rendering the content on the webpage because display configuration requirements for a webpage can differ from device to device and/or from browser to browser.

There are opportunities to improve the handling of multimedia content for webpage consumption.

BRIEF SUMMARY

One aspect provides a method for image optimization includes receiving, via an application programming interface (API), a first request for an image, wherein the first request comprises a cache key for the image, and the cache key comprises an image uniform resource locator (URL) and a header; querying, with the API, a data storage for the image based on the cache key; determining, based on a query response, that the image corresponding to the cache key is not in the data storage; retrieving an original image of the image indicated by the first request; sending, from the API, a first response to the first request, wherein the first response comprises an interim image and an image expiration time; converting, with an image processing component, the original image to an optimized image, wherein the optimized image comprises a format and dimensions corresponding to the image URL and the header of the cache key; storing the optimized image in the data storage; receiving, via the API at a time after the image expiration time, a second request for the image, wherein the second request comprises the cache key for the image; querying, with the API, the data storage for the image based on the cache key of the second request; and sending, from the API, a second response to the second request, wherein the second response comprises the optimized image, the optimized image is the image based on the cache key.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

DESCRIPTION OF THE DRAWINGS

The aspects set forth in the drawings are illustrative and exemplary in nature and are not intended to limit the subject matter defined by the claims. The following detailed description of the illustrative aspects can be understood when read in conjunction with the following drawings, where like structure is indicated with like reference numerals and in which:

DETAILED DESCRIPTION

Figure 1:
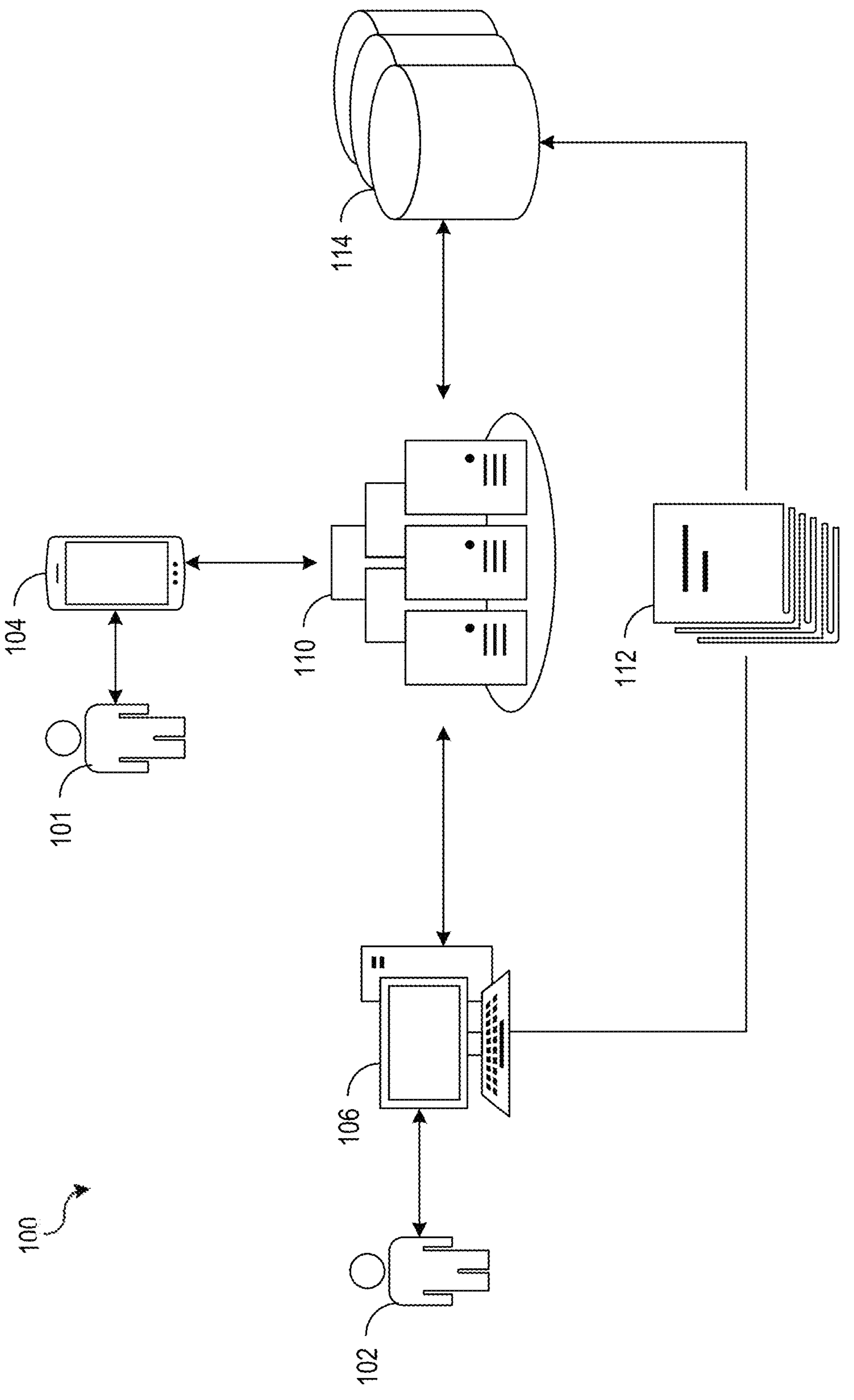
FIG. 1 depicts an example image optimization system configured to create, retrieve, and deliver multimedia content, according to one or more aspects shown and described herein.

Aspects of the present disclosure provide apparatuses, methods, processing systems, and computer-readable mediums for image optimization corresponding to delivery of image content for deployment on a webpage by a browser.

The image optimization techniques of the present disclosure address the lack of a centralized image management process, mitigate performance issues with runtime compression, decrease webpage sizes, and provide a balance between performance, compression, visual quality, and third party server caching of images. The image optimization techniques improve the overall performance of loading a webpage containing media content by providing mechanisms to reduce latency and improve search engine optimization (SEO) performance.

The image optimization techniques, which may be implemented by an image optimization (IO) application program interface (API) and that are described in more detail herein, provide technical solutions to several technical challenges and shortcomings related to optimizing images for utilization in webpages across various devices and/or browsers. In particular, current image handling techniques, such as Next.js® image optimization, Srcset attribute management, WordPress® image compression and plugins, and Gumlet® image optimization falls short in balancing performance, compression, and visual quality of images for webpages. Current image handling techniques introduce delays due to runtime processing or increase page size due to manual management of image sets, which can negatively affect image SEO (e.g., lower SEO ranking) and user experience with a webpage.

Current image handling techniques, which include for example, Next.js® image optimization, include a built-in image compression and conversion process for formats, such as AV1 Image File Format (AVIF) and Web Picture (WebP) format that execute at runtime. For purposes of the present disclosure, "runtime" refers to refers to the instance that a webpage is requested by a browser and the subsequent period of time that the instructions for loading the webpage are executed. The image format selection (e.g., AVIF or WebP) may be based on a calling browser. However, since Next.js® is configured to operate at runtime, Next.js® introduces delays in loading the content of the webpage. For example, when operations such as converting an image to a format or size operate a runtime and there is no image provided to the calling browser in the interim, the delays that are introduced negatively impact the SEO performance. Additionally, image caches are created on the server utilizing Next.js®, which requires external storage of the images to be separately configured, for example, to store compressed images or interface with the server utilizing Next.js®.

Other current image handling techniques, which include for example, srcset attribute management, enable developers to manually create a sreset that includes multiple sizes of the same image. This enables responsive image loading based on a browser and/or device's capabilities, such as image format compatibility with the browser and/or hardware configurations of the display of the device. However, srcset attribute management significantly increases the size of HTML pages because multiple sizes of the same images are included in the webpage, which impacts webpage load times and SEO performance. Additionally, srcset attribute management requires substantial manual work by developers to generate the sreset and assure it does not contain errors or inconsistencies that can lead to poor performance of a webpage. For example, when a common set of images is defined by the srcset for use across multiple webpages, any updates to the srcset must be manually reflected in the srcset for each webpage. Additionally, adding a new size involves at least two steps, first, generating and soring the new image, and second, updating the srcsets to include the new size. One or both of these steps can be overlooked, which can cause a browser to download larger or incorrectly sized images instead of the new size, which may be the optimized image size for the browser.

Further, current image handling techniques may utilize various plugins for image compression, resizing, and conversion of an image to WebP format. WebP is a raster graphics file format that compresses images for the web. For example, WordPress® image compression and plugins can automate some aspects of image optimization, such as image compression, resizing, or conversion of an image file format to WebP format, such that site administrators can manage image assets. However, the various plugins typically do not balance image quality and file size. Additionally, the runtime compression implemented by the various plugins can introduce delays that negatively impact SEO performance. Furthermore, images generated with WordPress® image compression and plugins are saved on a WordPress® server, which prevents an intelligent image format selection process from being implemented based on the calling browser since there is insufficient classification and access to the images saved on the WordPress® server by the intelligent image format selection process.

Gumlet image optimization is another example of current image handling techniques. Gumlet image optimization provides runtime image compression and caching, along with intelligent image format selection based on the calling browser. However, again, like other current image handling techniques, runtime compression can introduce delays that lower the quality of the user experience and reduce SEO performance. Additionally, Gumlet image optimization requires access to a webpage host's internal image store, and once the image is optimized, it is stored on a Gumlet server, thus decentralizing the image management and potentially necessitating developers to implement additional code in a webpage to interface and acquire images from the Gumlet server.

The image optimization techniques of the present disclosure provide technical solutions for the aforementioned technical problems by addressing the lack of a centralized image management process, mitigating performance issues with runtime compression, decreasing page sizes, and balancing between performance, compression, quality, and third party server caching of images.

As discussed above, existing third-party image compression tools often lack a centralized repository for images, making it difficult to manage and optimize images across multiple platforms, such as WordPress®, Next.js®, and .NET. This fragmentation can lead to inconsistent image quality and performance across different parts of a website or multiple websites. Additionally, compressing images at runtime introduces delays, especially on the first instance of a calling browser requesting a webpage, which can significantly impact page load times on platforms like WordPress®, Next.js®, Gatsby®, and Gumlet®. These delays negatively affect user experience and can result in lower SEO rankings due to slower page speeds. Additionally, when a developer manually creates srcset attributes for responsive images, it often leads to larger page sizes. The increased payload can slow down page load times, adversely affecting SEO performance and user experience.

Achieving an optimal balance between image performance, compression ratio, and visual quality is impractical with existing solutions. Such existing solutions either compromise on image quality to achieve higher compression or fail to provide the necessary performance enhancements, making it difficult to maintain high visual standards while ensuring fast load times and efficient bandwidth usage by providing an optimal image upon request of the webpage by the calling browser.

Aspects of the present disclosure provide image optimization techniques that include a centralized, image management system configured to optimize images before consumption by a webpage. For example, before images are consumed by the webpage, the image optimization techniques enable selection of and conversion to an optimal image format and image size based on compatibility with a calling browser or application, and return the optimal image for implementation in the webpage. Consumption of an image by a webpage refers to instances where a webpage that is configured to include the image that is requested by a browser or application for loading on a device. For example, webpages can be designed to include particular image content, for example a profile picture of a user. The format, size, resolution, and other attributes that would provide the best possible image quality for representation in the calling browser and/or on the display of the calling device depends on the calling browser and/or the display configuration of the device that implements the browser. For example, a browser implemented through a device such as a laptop computer may be capable of representing the image at a higher resolution and/or through a first format that utilizes less compression than a browser implemented through a device, such as a mobile phone, which includes a smaller display and/or a display with a different aspect ratio than the display of the laptop computer. Accordingly, when the webpage is requested by a calling browser, information pertaining to the calling browser type (e.g., Mozilla Firefox®, Google Chrome®, Microsoft Edge®, Apple Safari®, and the like) and/or the device hosting the browser may be provided to an IO API that is configured to determine, select, and return an image in a format that is optimal for the calling browser.

As used herein, the "calling browser" refers to the "browser" that is implemented by a device to request access to and receive delivery of a webpage, for example, through a Universal Resource Locator (URL) that is entered into the address bar of the calling browser. It should be understood that in some instances of the description provided herein the "calling browser" may be referred to as the "browser." In some instances, an application may be configured to request access to and receive delivery of a webpage in a similar manner as a browser. Aspects of the present disclosure are discussed with respect to a browser, but it should be understood that an application, including a web-based application, may interact with or implement image optimization techniques that are described herein.

Herein, the term "optimal" when used in reference to an image refers to an image having attributes that are compatible with the calling browser and/or the device that is deploying the browser and that balances performance of delivery of the image to the browser and device, the compression efficiency referring to how well the data is compressed in view of it quality, and with the visual quality. Image attributes considered by image optimization techniques described herein may include attributes, such as format, compression ratio, resolution, size, and others that are compatible with the calling browser and/or defined by the browser based on the device that is deploying the browser. For example, certain browsers may have file formats, compression ratios, or the like that the browser is configured to process in an efficient manner. The attributes that are optimal may depend on the device that is deploying the browser. For example, some devices have display specifications that define a certain range of compatible image sizes, resolutions, compression ratios, or file formats. Browsers can indicate which image formats are support (e.g., AVIF, WebP, PNG, or the like) and the device type (mobile, desktop, or the like). Based on the browser and the display specifications of the device, there are standards that define the optimlat image size. In some aspects, the image optimization techniques described herein can standardize the compression ratio, but information like compression ration may not be provided by the browsers or devices. In some aspects, developers can override the standardized compression ratio and define an alternative that may be more optimal for a particular browser or device.

The image optimization techniques and image management system described herein employ an IO API configured to interface with a content delivery network (CDN). A CDN is a network of interconnected services (e.g., a geographically distributed group of servers) that caches content and facilitates fulfilling requests for content from a webpage. For example, when a calling browser requests a webpage, a CDN retrieves content, such as images, from the webpage's server and/or one or more additional web servers. The CDN may then store a copy if the content in its own data centers so that when the data is requested again, the CDN can deliver it from its nearest data center, if available. However, the CDN may not maintain all possible images in all available formats, compressions, resolutions, and sizes that would be optimal for each calling browser that may request a webpage. As such, in instances where the CDN does not have a cache of an image with the requested image attributes, the image optimization techniques, enable the IO API to facilitate an image handling process that balances latency, storage and bandwidth costs for maintaining and delivering images that are optimal for the calling browser, and load time of the webpage that can impact a user's experience and/or SEO performance.

The image optimization techniques described herein provide processes and component interactions that provide content to, for example, the CDN, to fulfill the content request for loading a webpage that addresses technical challenges present with current image handling techniques. Aspects of the image optimization techniques deliver technical benefits over current image handling techniques, in part, due to the background image optimization processing and storage processes and further with respect to the exception handling process that enable an interim image to be provided while an original image may be converted into an optimized image for the calling browser. The latter may arise when a calling browser requests an image having a file format, compression, resolution, and/or size that was not generated during the background image optimization processing of images by the IO API. The interim image may be selected based being a match to the most number of attributes of the requested image (e.g., the optimal image is defined based on compatibility with the calling browser). For example, the interim image may have a file format and compression that corresponds to the requested image, but may not be an exact match to the size of the requested image. In other examples, a file format of an image may not be an optimal format for the calling browser to handle, but if all other attributes of the requested image correspond to an image that was generated by the background image optimization processing, then the IO API may return that image as an interim image while the IO API facilitates converting (e.g., generating) the optimal image in parallel and subsequently delivering the optimal image when it is available.

Aspects of the image optimization techniques provided herein address at least the aforementioned technical problems by automating a background image optimization process that generates suitable images for most any browser before consumption by a webpage. The image optimization techniques also implements an intelligent caching process that delivers an image even when an optimal image may not already exist in response to the background image optimization process and provides a centralized repository to compress and resize images across different platforms, such as WordPress®, Next.js®, .NET, and the like. Additionally, aspects of the image optimization techniques described herein enable format versatility by supporting multiple image formats including, for example, AVIF, WebP, JPG, JPEG, PNG, and the like with customizable sizes and compression ratios. The image optimization techniques described herein provide the technical benefit of providing real-time or near real-time responses that include optimal image content when a webpage is requested by a browser, which beneficially reduces or eliminates load time delays as compared to current image handling techniques that utilize runtime compression. Additionally, the image optimization techniques described herein provide a beneficial technical benefit of reducing operational costs associated with storage and bandwidth by providing a centralized repository of pre-processed background images that can be directly queried and retrieved by the IO API instead of through srcset attribute management that requires manual generation of different image options leading to larger webpages and ultimately requiring more bandwidth.

As used herein, the term "near real-time" refers to events occurring slightly slower than real-time, which refers to instantaneous or action happening at once. The term "near-real time" may include a margin of time required for processing to be carried out with a computing device, which in the certain aspects may be time to generate a response to the request for an image for a webpage being deployed in a browser.

Example Image Optimization System

FIG. 1 depicts an example image optimization system 100 configured to create, retrieve, and deliver multimedia content, such as images for use in a webpage that are optimized for a calling browser. The image optimization system 100 may be configured to interface with one or more users (e.g., a first user 101 and second user 102). The first user 101 may be an end-user of a webpage. The second user 102 may a developer of a webpage or content creator of a webpage.

The first user 101, through a first device 104, may enter a URL into an address bar of a browser to access a webpage. The first device 104, may be a personal computer, a cellular telephone, a PDA, smart device, or the like. The URL indicates to a web server 110 a webpage to provide to the browser of the first device 104. The web server 110, which may include a number of various servers configured to implement various internet protocols for facilitating webpage hosting and content retrieval and deployment, may be communicatively coupled to one or more data storage devices 114 (also referred to herein as data storage device 114) that maintain content for a webpage. In some aspects, the data storage device 114 may make up part of a CDN, a cloud-based storage system, and/or a company-specific web server system for hosting webpages.

The second user 102, through a second device 106, may create and edit webpages accessible through the web server 110 and provide content 112, such as multimedia content including images, electronic documents, and the like to the data storage device 114.

The first device 104, may be a personal computer, a cellular telephone, a PDA, smart device, or the like. The second device 106 may be a personal computer, a cellular telephone, a PDA, smart device, or the like. The first device 104 and/or the second device 106 may include a display device for implementing a browser to provide a webpage through a user interface for a respective user, one or more processors for executing logic and one or more non-transitory computer-readable mediums for storing information and/or computer readable instructions. In certain aspects, web server 110 may be one or more computing devices. The one or more computing devices may include one or more processors and one or more non-transitory computer-readable mediums storing computer readable instructions that, when executed by the one or more processors, cause the computing device to perform processes defined by computer-readable instructions corresponding to one or more components depicted and described herein. The data storage device 114 may be one or more computing devices, such as a content server, a cloud-based server, virtual machine, or the like.

Example Image Optimization Components and Processes

Figure 2:
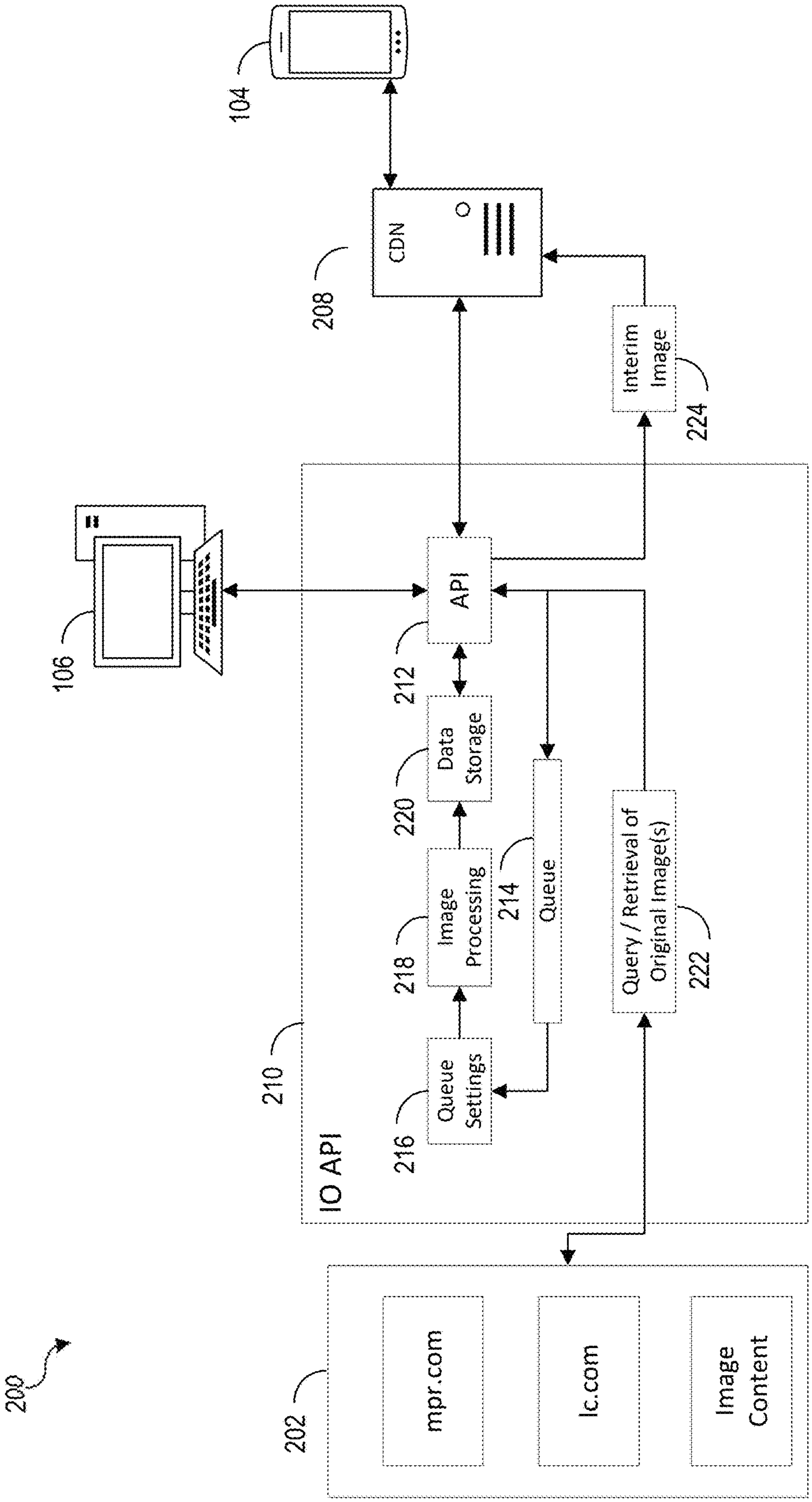
FIG. 2 depicts an illustrative diagram of components utilized by image optimization techniques, according to one or more aspects shown and described herein.

FIG. 2 depicts an illustrative diagram of the system 200 and components thereof implementing the image optimization techniques provided herein. Components of the IO API system implementing the image optimization techniques may be communicatively coupled to a content storage device 202 and a CDN 208. The system 200 may include a computing device implementing the IO API 212, background image optimization queue 214 (e.g., implemented by a storage service, such as a cloud storage service), a queue settings component 216, an image processing component 218, and a centralized data storage component 220.

The content storage device 202 may be a cloud-based server or physical server device. The content storage device 202 may include at least original files for multimedia content that may be utilized by a webpage. For example, an original profile image of a user for an electronic document, such as a resume, may be maintained in the content storage device 202. The content storage device 202 may be accessible by the IO API 212 to retrieve and/or receive original files of multimedia content for background image optimization. The background image optimization processes generally prepare a set of images that would be compatible with various browsers prior to a browser making a request for the image.

The IO API 212 is a component, for example that is implemented by a computing device and configured to carry out processes described herein that orchestrate and implement the image optimization techniques. The IO API 212 enables communication and coordination of the transfer of data between the CDN 208 and the IO API system 210. The IO API 212 also orchestrates the background image optimization processes described herein with reference to at least FIG. 3. The background image optimization processes enable the image optimization techniques to provide technical solutions to the technical challenges of the current image handling techniques. In some aspects, the second device 106 may also communicate with the IO API 212, for example, when changes to image content or new image content needs to be processed through the background image optimization processes. For example, this may occur when new webpages are developed or existing webpages are edited. This may also occur when a new browser or an existing browser configuration should be added to the background image optimization processes.

As discussed further herein, an original image may be obtained, for example, through a query component 222, by the background image optimization process for conversion into a set of images. Each of the set of images is configured to an image that is optimal for a respective webpage for transmission to and deployment by a calling browser and/or device. The queue settings component 216 may indicate the one or more image attributes that should be created for each original image that is input by the IO API 212 for background image optimization processing. The background image optimization processing is discussed in more detail with reference to FIG. 4. In general, when an original image is received by the IO API 212 or when the data storage component 220 does not include an image requested through the CDN 208 for providing to a browser of the first device 104, the IO API 212 initiates the background image optimization process. The original image is converted, by the image processing component 218, into one or more different images (e.g., a set of images) according to the queue settings component 216 that may indicate the one or more image attributes that should be created for each original image. The set of images may be indexed and stored in the centralized data storage component 220. The centralized data storage component 220 is queryable, for example, based on a file name and one or more attributes, including but not limited to, file format, compression ratio, resolution, size, and/or the like. The one or more attributes may be defined by the browser type that requests return of an image with a specified file name.

Figure 3:
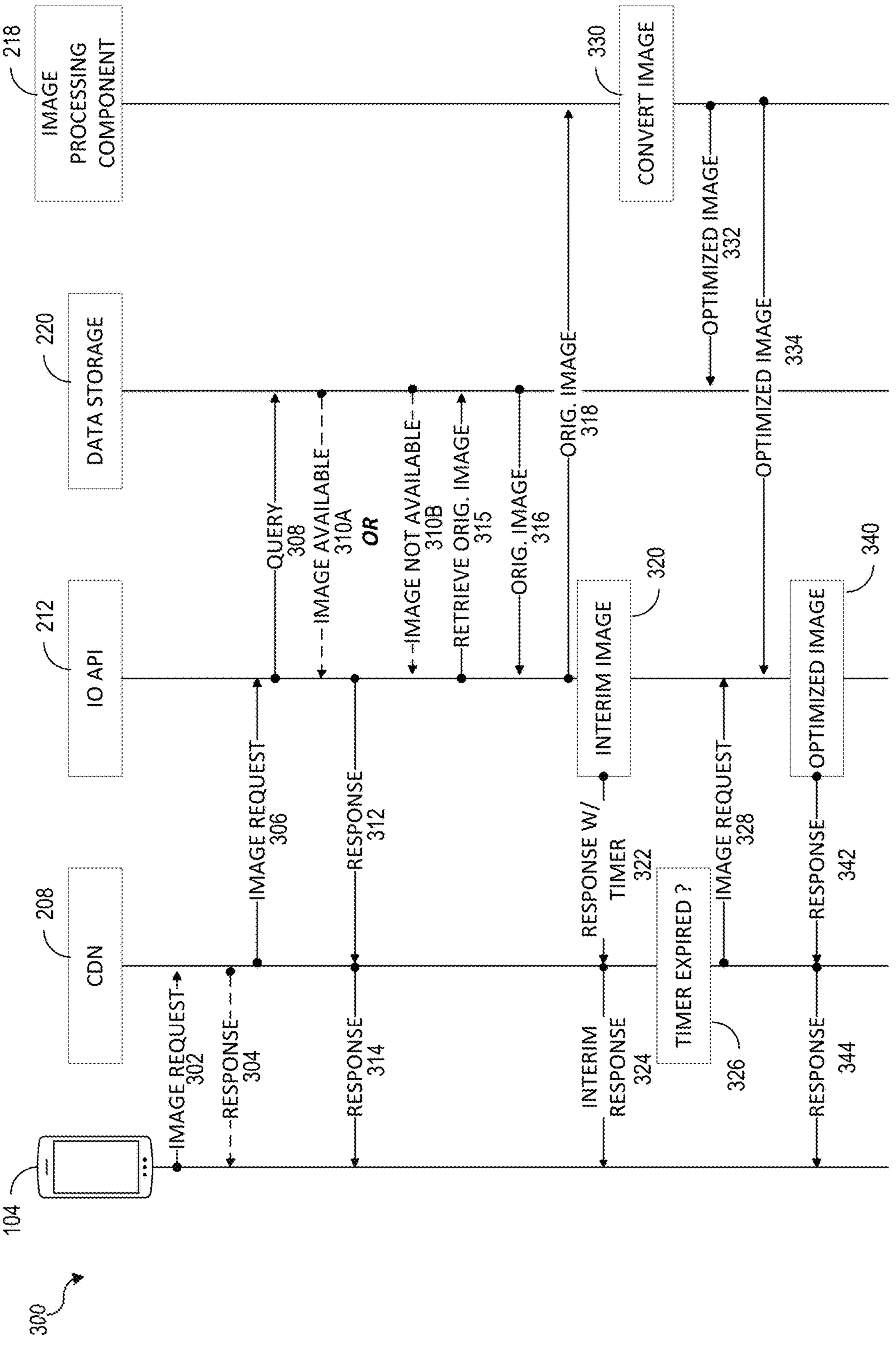
FIG. 3 depicts an illustrative diagram of the operations and interactions between components utilized by the image optimization techniques depicted in FIG. 2, according to one or more aspects shown and described herein.

Referring now to FIG. 3, operations of the IO API system 210 are described in more detail. FIG. 3 depicts an illustrative diagram 300 of the operations and interactions between components utilized by the image optimization techniques depicted in at least FIG. 2. The components and respective processes implemented by the components may be deployed by the web server 110 and/or the data storage device 114 depicted with reference to FIG. 1.

In certain aspects, a user of a first device 104, for example, a mobile phone, can enter a URL in the address bar of a browser. The browser generates and sends an image request 302 to the CDN 208. The image request 302 may include a cache key of the image. A cache key may be a unique identifier for an object in the cache, for example in the form of a query string with parameters corresponding to one or more values. The cache key may include multiple values, including for example, the URL, a header, and/or other values. The header field may specify a content type(s) (e.g., one or more file format types that are compatible with the calling browser) and/or other information such as the one or more attributes of the content to be returned (e.g., the compression ratio, the resolution, the size, or the like of the image). In specific instances where the cache key indicates an image that is cached in the CDN 208, the CDN 208 generates and sends a response 304 to the first device with the requested image. However, when the CDN 208 does not include a cache of the requested image specified in the image request 302, the CDN 208 sends a second image request 306 to the IO API 212. The IO API 212 may immediately query 308 the data storage component 220 of the IO API system 210 for the requested image.

If the requested image is available 310A in the data storage component 220, the IO API 212 retrieves the requested image and returns the requested image in a second response 312 to the CDN 208, which may further return the requested image in a third response 314 to the first device 104. The aforementioned immediate action and response that is carried out by the IO API 212 is enabled by the fact that the IO API 212 generates variations of the original images that may be optimal for calling browsers to implement before consumption of the image by the webpage. As discussed above with reference to FIG. 2 and at least the queue settings component 216, the IO API 212 defines image attributes that would be optimal for one or more different calling browsers and/or devices so that an optimal image may be generated by the image processing component 218 before the calling browser requests a webpage. The IO API 212 may be specific to a web host, for example, a company that manages and hosts webpages for users. In some aspects, the IO API 212 may be integrated within a cloud-based system, for example, that manages the cache of a CDN 208 such that the CDN 208 may include readily available variations of requested images for different browsers that may request a webpage having multimedia content, such as images.

However, there may be instances where the data storage component 220 does not have the requested image available for immediate delivery in response to the second image request 306. In such instances, the data storage component 220 may be configured to return an image that most closely matches the query 308 with an indication 310B that the requested image is not available. The image that is selected and returned to the browser based on the second image request 306 may be selected based on one or more rules. In one example, if the browser supports all image formats or at least AVIF, the image having an AVIF format will be returned as it has the smallest file size. If the browser does not support AVIF, but does support WebP, then the image having a WebP format will be returned as it has the next smallest file size. Furthermore, if the browser does not support AVIF or WebP, an original and resized image (e.g., an image that is resized to a height and width as requested by the browser), may be returned to the browser. Should there be an instance where the requested image is not available in a compressed format yet or is too small to be compressed, the original image may be returned, and optionally resized before returning to the browser since resizing operations can be performed much faster than compression operations. In some instances, the image may be available in the data storage component 220, but is not in the requested size (e.g., a height and width requested by the browser). As noted above, sine the resizing operation can be performed much faster than compression operations, the image may be resized and then sent in response to the request from the browser. However, in yet further instances, the image is not available as an optimized image in the data storage component 220. In such instances, the original image may be fetched from another source and may be sent as-is with an image expiration time, optionally set to a few seconds or a minute, (e.g., 10 second, 20 seconds, 30 seconds, 40 seconds, 50 seconds, 55 seconds, 60 seconds, or any amount of time from 2 seconds to 60 seconds). As described in more detail herein, the image is also queued for the background job to compress and convert to one or more pre-configured formats and sizes for responding to the present request and future requests.

In some aspects, where the data storage component 220 does not have the requested image available for immediate delivery in response to the second image request 306, the data storage component 220 may return the original image 316 to the IO API 212, for example, optionally based on a retrieval request 315. In some aspects, the original image may be obtained from the content storage device 202. The IO API 212 transmits the original image 318 to the image processing component 218. The transmission of the original image 318 to the image processing component 218 may include instructions to perform one or more conversion processes on the original image to generate the requested image with the attributes indicated by the image request 302.

While still referring to the instance where the requested image is not available, the IO API 212 returns an interim image 320 and initiates an image expiration time 322 that is included as part of the response to the CDN 208 with the interim image 320. The image expiration time 322 indicates to the CDN 208 that within the time period defined by the image expiration time 322, the IO API 212 should be providing a replacement image corresponding to the requested image of the image request 302. The IO API 212 may return an interim image 320 in parallel with or in near-real time with transmitting the original image 318 to the image processing component 218. The interim image 320 may be the original image or may be an image determined to most closely match the query 308. The CDN 208 may provide the interim image 320 to the first device as an interim response 324 to the image request 302, so that the webpage may continue to load without the delay in waiting for the optimized image to be generated by the image processing component 218.

The image expiration time 322 may further cause the CDN 208 not to cache the interim image 320 as a valid image to respond to future image requests indicating the same requested image. This can prevent the CDN 208 from incorrectly associating interim images 320 with images that may be validly cached with the CDN 208 for future inquires.

Additionally, in some aspects, the image expiration time 322 may cause the CDN 208 to generate and send a subsequent image request 328 to the IO API 212 when the CDN 208 determines that the image expiration time 322 has passed (e.g., timer expired? 326). The subsequent image request 328 may trigger the IO API 212 to provide further response to the CDN 208. The further response 342 may be a second image expiration time or may be the optimized image 340. In some aspects, the IO API 212 may generate and send the further response 342 once the optimized image 340 is generated by and received from the image processing component 218, without being prompted by the subsequent image request 328.

Referring to the image processing component 218, when the IO API 212 transmits the original image 318 to the image processing component 218, the image processing component 218 converts the original image into an optimized image at 330 based on the instructions and/or attributes provided by the IO API 212. The image processing component 218 may utilize an image processing tool, such as, but not limited to, NetVips®, ImageMagick®, Sharp, or the like to convert the original image into the optimized image. The image processing component 218 may be called by the IO API 212 directly or triggered indirectly upon new image content being added to the data storage component 220. In certain aspects, upon completing a conversion of the original image, the image processing component 218 may cause a copy 332 of the optimized image 340 to be indexed and stored with the data storage component 220. In certain aspects, upon completing a conversion of the original image, the image processing component 218 transmits 334 the optimized image 340 to the IO API 212 or provides an indication to the IO API 212 that the optimized image 340 is available for use.

Whether triggered by a subsequent image request from the CDN 208, for example, based on passage of the image expiration time, or an indication that the optimized image 340 is available from the image processing component 218, the IO API 212 transmits (e.g., with the further response 342) the optimized image 340 to the CDN 208. Subsequently, the CDN 208 transmits an updated response 344 to the browser of the first device 104 thereby causing the interim image 320 to be replaced with the optimized image 340. The optimized image 340 corresponds to the attributes of the requested image, which is based on the calling browser (e.g., the specifications of the calling browser and/or format the browser is configured to provide the webpage content) of the first device 104.

Figure 4:
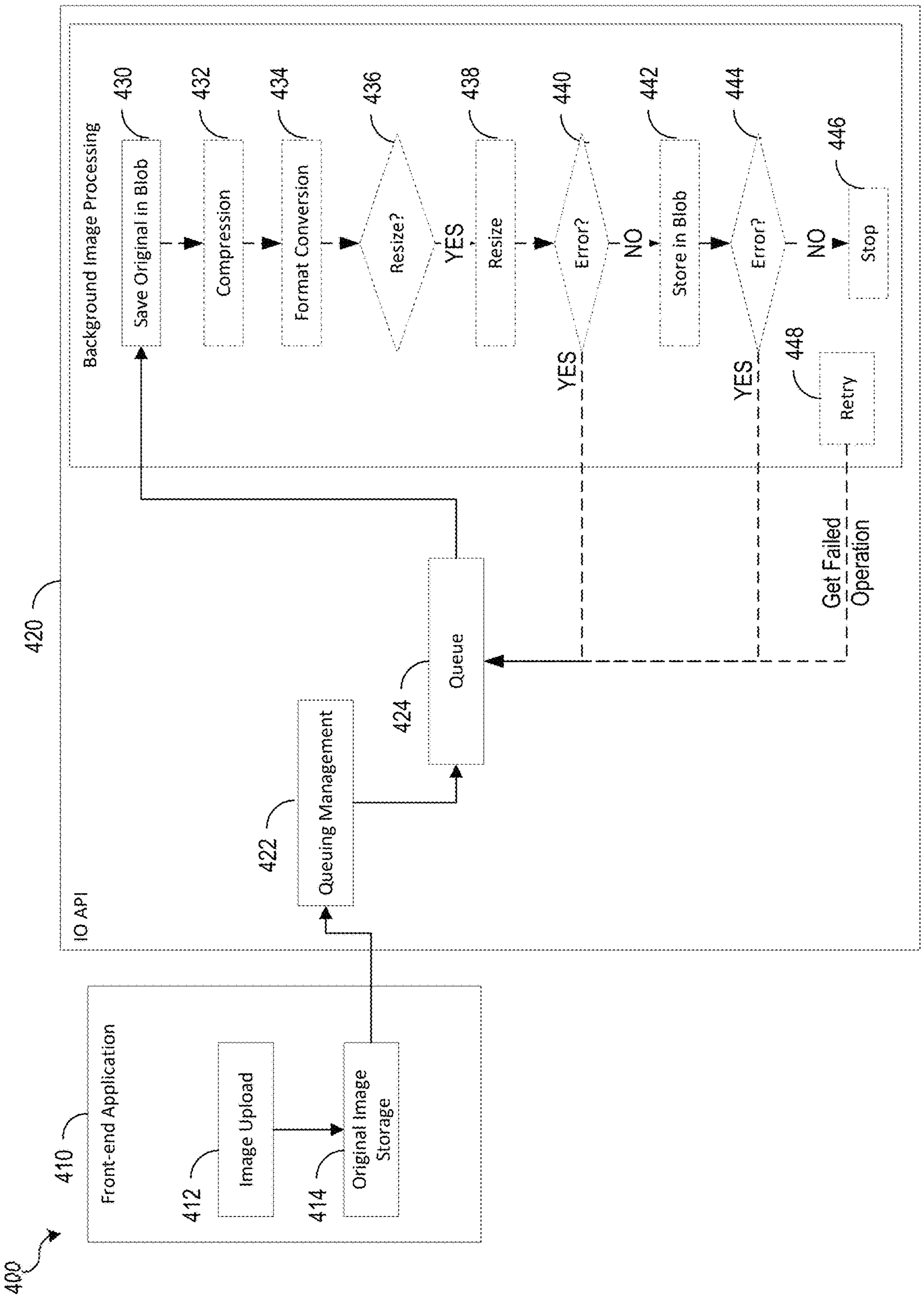
FIG. 4 depicts a diagram that illustrates a background image optimization process, according to one or more aspects shown and described herein.

FIG. 4 depicts a diagram 400 that illustrates the background image optimization processing of original images, which may occur before consumption of the images by a webpage or when a requested image is not available in the data storage component 220. The background image optimization processing of original images is a process of the system 200. In certain aspects, original images may be uploaded 412 by a developer through the second device 106 and stored 414 in a data storage component 220 or content storage device 202 that are communicatively coupled to the IO API 212. At block 422, the IO API 212 queues the one or more original images for background processing in a queue 424. The queue 424 may be a cloud storage service, including but not limited to Azure™ Blob Storage.

Blocks 430-448 refer to operations of the background image optimization process. At block 430, the original image is saved, for example, in the data storage component 220 at the original image size. The original image may be saved in the data storage component 220 at one or more different sizes.

At block 432, a compression process may be implemented for each of the respective sizes of the original images. The compression process implemented at block 432 may include a process that removes bytes of information from the image, rewrites the image file according to an algorithm that reduces the memory the image utilizes, trims redundant data from the image, such that some colors or pixels that are redundant are removed, or uses a visual perception algorithm such as a machine learning model that is configured to compress an image while maintain how a human may perceive the image.

At block 434, the file format of the original images may be converted to one or more other file formats, such as WebP or AVIF. One or more known file format conversion tools may be implemented to complete the conversion of the original image to another file format.

At block 436, the background image optimization process may be configured to determine whether any of the converted file types need to be resized since the file type conversion process at block 434 may change the output image size. If "Yes" at block 436, the background image optimization process proceeds to block 438, where a resizing process is carried out. If "No" at block 436, the background image optimization process may proceed with a further check at block 440 to determine whether there are any errors in the converted image file types, such as a converted image file being unable to be rendered due to a possible corruption of data during the file type conversion at block 434. If "Yes" at block 440, the image files that are indicated as containing an error may be removed from the queue 424, such that the IO API 212 will not expect an output image with the respective file type. In some aspects, if there is an error indicated with the image files, "Yes" at block 440, the image optimization process may be caused to reprocess the image or images indicated as containing an error at block 430. If "No" at block 440, the background image optimization process proceeds with storing the converted images to the data storage component 220, at block 442.

An additional error check may be performed at block 444 to determine whether any of the converted files were not added to the data storage component 220, at block 442. If a file is missing, for example, "Yes" at block 444, an indication is provided to the queue 424, so that the IO API 212 may generate a flag indicating an error with the generation of one of the expected output images and/or cause the background image optimization process to be executed again, at block 448, to generate the missing image file. If no errors are found at block 444, "No," then the background image optimization process indicates completion at block 446 and terminates.

It should be understood that the aforementioned background image optimization process is only one example. Other background image optimization processes may be implemented to generate one or more different sized, formatted, or compressed images for use by the image optimization techniques described herein.

Example Method for Image Optimization

Figure 5:
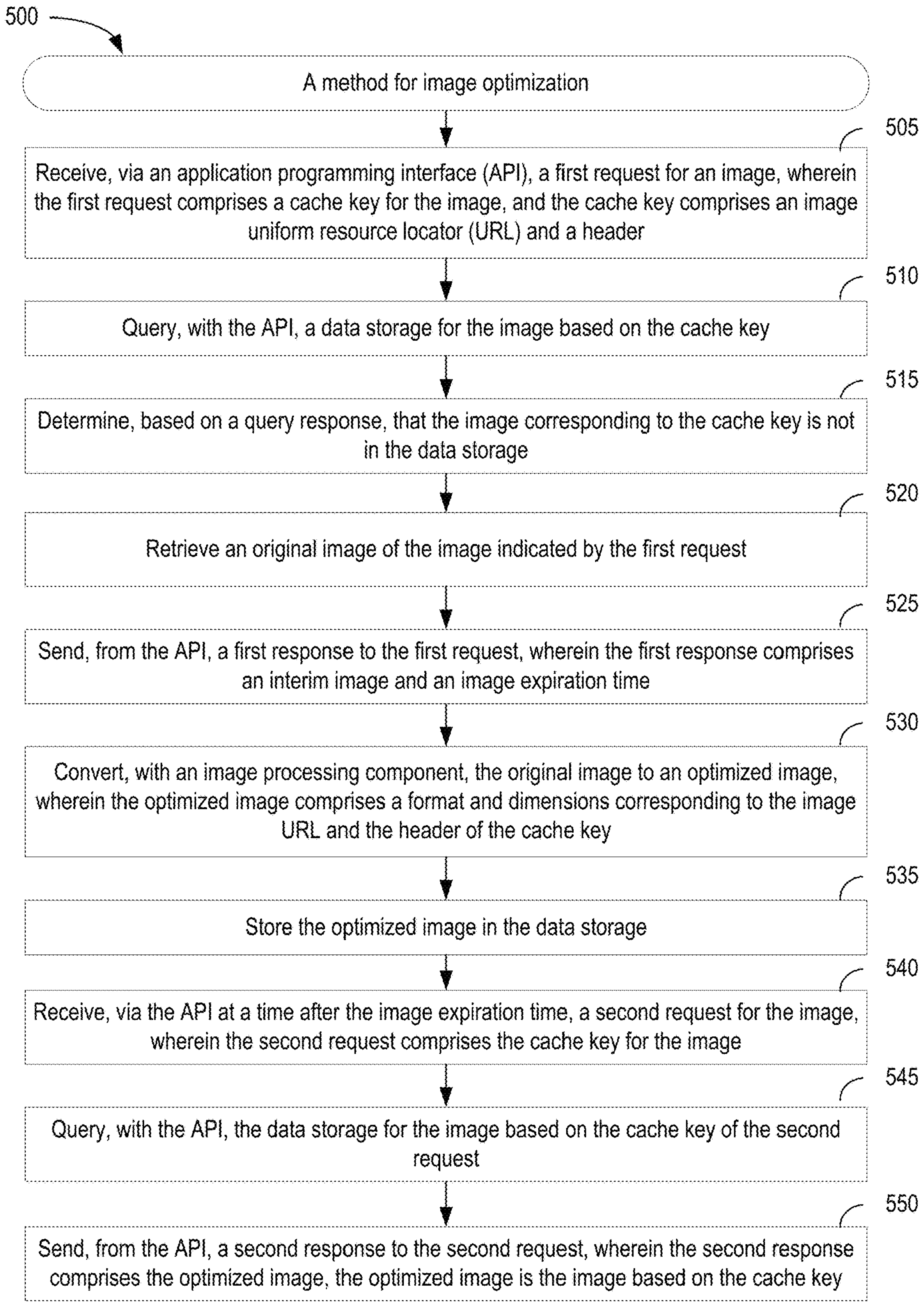
FIG. 5 depicts a flowchart of a method for image optimization, according to one or more aspects shown and described herein.

FIG. 5 depicts a flowchart of a method for image optimization. In some aspects, the method 500 may be performed by an apparatus, such as the first device 104 and/or the second device 106 of the image optimization system 100 depicted and described with reference to FIG. 1, the system 200 depicted and described with reference to FIG. 2, and/or the apparatus 600 of FIG. 6, which includes various components operable, configured, or adapted to perform the method 500. Example apparatus 600 is described below in further detail.

Method 500 begins at block 505 with receiving, via an application programming interface (API), a first request for an image, wherein the first request comprises a cache key for the image, and the cache key comprises an image URL and a header. For example, block 505 may be performed by the image optimization system 100 described above with reference to FIG. 1 that is configured to receive an image request (e.g., the image request 306) from the CDN 208 as depicted and described with reference to FIGS. 2 and 3.

Method 500 then proceeds to block 510 with, querying, with the API, a data storage for the image based on the cache key. For example, block 510 may be performed by the image optimization system 100 described above with reference to FIG. 1. For example, the IO API 212 may query 308 the data storage component 220 of the IO API system 210 for the requested image as depicted and described with reference to FIGS. 2 and 3.

Method 500 then proceeds to block 515 with determining, based on a query response, that the image corresponding to the cache key is not in the data storage. For example, the IO API 212 may receive an indication 310B that the requested image is not available as depicted and described with reference to FIGS. 2 and 3.

Method 500 then proceeds to block 520 with retrieving an original image of the image indicated by the first request. For example, the IO API 212 may obtain the original image 316 or an interim image that most closely matches the requested image from the data storage component 220, for example, optionally based on based on a retrieval request 315 as depicted and described with reference to FIGS. 2 and 3.

Method 500 then proceeds to block 525 with sending, from the API, a first response to the first request, wherein the first response comprises an interim image and an image expiration time. For example, the IO API 212 may return an interim image 320 and initiate an image expiration time 322 that is included as part of the response to the CDN 208 with the interim image 320 as depicted and described with reference to FIGS. 2 and 3.

Method 500 then proceeds to block 530 with converting, with an image processing component, the original image to an optimized image, wherein the optimized image comprises a format and dimensions corresponding to the image URL and the header of the cache key. For example, the IO API 212 may transmit the original image 318 to the image processing component 218, where the image processing component 218 is configured to convert the original image into an optimized image at 330 based on the instructions and/or attributes provided by the IO API 212. The image processing component 218 may utilize an image processing tool, such as, but not limited to, NetVips®, ImageMagick®, Sharp, or the like to convert the original image into the optimized image as depicted and described with reference to FIGS. 2 and 3.

Method 500 then proceeds to block 535 with storing the optimized image in the data storage. For example, the IO API 212 may, upon completing a conversion of the original image, cause the image processing component 218 to store a copy 332 of the optimized image 340 in the data storage component 220 as depicted and described with reference to FIGS. 2 and 3.

Method 500 then proceeds to block 540 with receiving, via the API at a time after the image expiration time, a second request for the image, wherein the second request (e.g., the subsequent image request 328) comprises the cache key for the image. For example, image expiration time 322 may cause the CDN 208 to generate and send a subsequent image request 328 to the IO API 212 when the CDN 208 determines that the image expiration time 322 has passed (e.g., timer expired? 326) as depicted and described with reference to FIGS. 2 and 3.

Method 500 then proceeds to block 545 with querying, with the API, the data storage for the image based on the cache key of the second request (e.g., the subsequent image request 328).

Method 500 then proceeds to block 550 with sending, from the API, a second response to the second request, wherein the second response comprises the optimized image, the optimized image is the image based on the cache key. For example, the IO API 212 may be configured to generate and send the further response 342 once the optimized image 340 is generated by and received from the image processing component 218 as depicted and described with reference to FIGS. 2 and 3.

In some aspects, block 530 includes converting the original image comprising a first format to the optimized image comprising a second format, the second format is different from the first format, and the second format is one of: an AV1 Image File Format (AVIF), a Web Picture (WebP) format, a Portable Network Graphic (PNG) format, or a Joint Photographic Experts Group (JPEG or JPG) format.

In some aspects, the image URL indicates an image address and the dimensions of the image.

In some aspects method 50 further includes determining the format of the image based on the header, wherein querying, with the API, the data storage for the image further comprises searching for the image in the determined format.

In some aspects, the format of the image is compatible with a browser type indicated by the header, and the browser type corresponds to a browser that sent the first request.

In some aspects, block 530 includes at least one of: converting the original image comprising a first format to the optimized image comprising a second format, or converting the original image comprising first dimensions to the optimized image comprising second dimensions.

In some aspects method 500 further includes extracting, via the API, a first image from the data storage based on the querying of the data storage for the image based on the cache key, wherein at least one of an image format or one or more image dimensions of the first image match the format or dimensions corresponding to the image URL and the header of the cache key; and determining that the interim image is either the original image or the first image based on a comparison of respective file sizes of the original image and the interim image, wherein the interim image is one of the original image or the first image comprising a smaller file size.

In some aspects method 500 further includes receiving one or more original images; converting, with the image processing component, the one or more original images to one or more additional images, wherein each of the one or more additional images are formatted and dimensioned corresponding to respective ones of a plurality of browser types; and storing the one or more additional images in the data storage.

In some aspects, the API is configured to receive requests from and send responses to a content delivery network (CDN).

Method 500 thus provides technical solutions to several technical challenges and shortcomings related to optimizing images for utilization in webpages across various devices and/or browsers. Method 500 provides the technical benefit of providing real-time or near real-time responses that include optimal image content when a webpage is requested by a browser, which beneficially reduces or eliminates load time delays as compared to current image handling techniques that utilize runtime compression. Additionally, the image optimization techniques described herein provide a beneficial technical benefit of reducing operational costs associated with storage and bandwidth by providing a centralized repository of pre-processed background images that can be directly queried and retrieved by the IO API. The described aspects of image optimization address the lack of a centralized image management process, mitigate performance issues with runtime compression, decrease webpage sizes, and provide a balance between performance, compression, visual quality, and third party server caching of images. The image optimization techniques improve the overall performance of loading a webpage containing media content by providing mechanisms to reduce latency and improve search engine optimization (SEO) performance.

Example Apparatus

Figure 6:
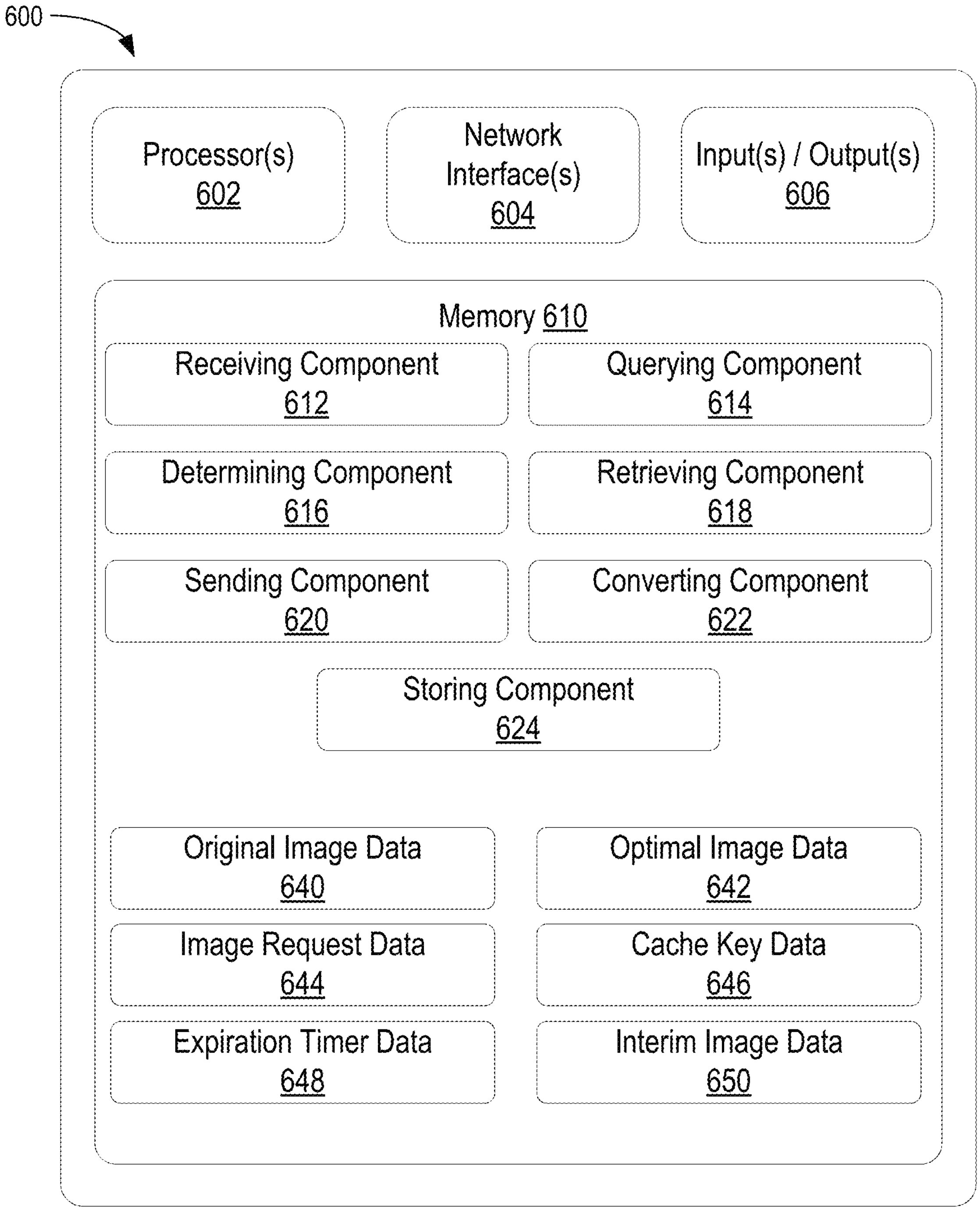
FIG. 6 depicts an example computing device configured to perform image optimization, according to one or more aspects shown and described herein.

FIG. 6 depicts an example apparatus 600 configured to perform methods described herein. The example apparatus 600 depicted in FIG. 6 may be the first device 104 and/or the second device 106 of the image optimization system 100 depicted and described herein and with reference to FIG. 1 and/or a computing device of system 200 configured to implement the IO API 212.

The example apparatus 600 includes one or more processors 602. Generally, processor(s) 602 may be configured to execute computer-executable instructions (e.g., software code) to perform various functions, as described herein.

The example apparatus 600 further includes a network interface(s) 604, which generally provides data access to any sort of data network, including personal area networks (PANs), local area networks (LANs), wide area networks (WANs), the Internet, and the like.

The example apparatus 600 further includes input(s) and output(s) 606, which generally provide means for providing data to and from the example apparatus 600, such as via connection to computing device peripherals, including user interface peripherals.

The example apparatus 600 further includes a memory 610 configured to store various types of components and data.

In this example, memory 610 includes a receiving component 612, querying component 614, determining component 616, retrieving component 618, sending component 620, converting component 622, storing component 624, receiving component 626, querying component 628, and sending component 630.

Receiving component 612 may be configured to perform processes, for example, corresponding to block 505 and block 540 of method 500 depicted and described with reference to FIG. 5. Querying component 614 may be configured to perform processes, for example, corresponding to block 510 and block 545 of method 500 depicted and described with reference to FIG. 5. Determining component 616 may be configured to perform processes, for example, corresponding to block 515 of method 500 depicted and described with reference to FIG. 5. Retrieving component 618 may be configured to perform processes, for example, corresponding to block 520 of method 500 depicted and described with reference to FIG. 5. Sending component 620 may be configured to perform processes, for example, corresponding to block 525 and block 550 of method 500 depicted and described with reference to FIG. 5. Converting component 622 may be configured to perform processes, for example, corresponding to block 530 of method 500 depicted and described with reference to FIG. 5. Storing component 624 may be configured to perform processes, for example, corresponding to block 535 of method 500 depicted and described with reference to FIG. 5.

In this example, memory 610 also includes original image data 640 (e.g., a profile image or the like), optimal image data 642 (e.g., optimized image 340 and optimal image content generated by the image optimization techniques described herein), image request data 644 (e.g., the image request 302), cache key data 646 (e.g., cache key for an image of a webpage), expiration timer data 648 (e.g., the image expiration time 322), and interim image data 650 (e.g., interim image 320).

The example apparatus 600 may be implemented in various ways. For example, the example apparatus 600 may be implemented within on-site, remote, or cloud-based computing devices.

The example apparatus 600 is just one example, and other configurations are possible. For example, in alternative embodiments, aspects described with respect to the example apparatus 600 may be omitted, added, or substituted for alternative aspects.

Example Clauses

Implementation examples are described in the following numbered clauses:

Clause 1: A method for image optimization, comprising receiving, via an application programming interface (API), a first request for an image, wherein the first request comprises a cache key for the image, and the cache key comprises an image uniform resource locator (URL) and a header; querying, with the API, a data storage for the image based on the cache key; determining, based on a query response, that the image corresponding to the cache key is not in the data storage; retrieving an original image of the image indicated by the first request; sending, from the API, a first response to the first request, wherein the first response comprises an interim image and an image expiration time; converting, with an image processing component, the original image to an optimized image, wherein the optimized image comprises a format and dimensions corresponding to the image URL and the header of the cache key; storing the optimized image in the data storage; receiving, via the API at a time after the image expiration time, a second request for the image, wherein the second request comprises the cache key for the image; querying, with the API, the data storage for the image based on the cache key of the second request; and sending, from the API, a second response to the second request, wherein the second response comprises the optimized image, the optimized image is the image based on the cache key.

Clause 2: The method of Clause 1, wherein the step of converting the original image to the optimized image comprises converting the original image comprising a first format to the optimized image comprising a second format, the second format is different from the first format, and the second format is one of: an AV1 Image File Format (AVIF), a Web Picture (WebP) format, a Portable Network Graphic (PNG) format, or a Joint Photographic Experts Group (JPEG or JPG) format.

Clause 3: The method of any one of Clauses 1-2, wherein the image URL indicates an image address and the dimensions of the image.

Clause 4: The method of any one of Clauses 1-3, further comprising: determining the format of the image based on the header, wherein querying, with the API, the data storage for the image further comprises searching for the image in the determined format.

Clause 5: The method of Clause 4, wherein the format of the image is compatible with a browser type indicated by the header, and the browser type corresponds to a browser that sent the first request.

Clause 6: The method of any one of Clauses 1-5, wherein converting, with the image processing component, the original image to the optimized image comprises at least one of: converting the original image comprising a first format to the optimized image comprising a second format, or converting the original image comprising first dimensions to the optimized image comprising second dimensions.

Clause 7: The method of any one of Clauses 1-6, further comprising: extracting, via the API, a first image from the data storage based on the querying of the data storage for the image based on the cache key, wherein at least one of an image format or one or more image dimensions of the first image match the format or dimensions corresponding to the image URL and the header of the cache key; and determining that the interim image is either the original image or the first image based on a comparison of respective file sizes of the original image and the interim image, wherein the interim image is one of the original image or the first image comprising a smaller file size.

Clause 8: The method of any one of Clauses 1-7, further comprising: receiving one or more original images; converting, with the image processing component, the one or more original images to one or more additional images, wherein each of the one or more additional images are formatted and dimensioned corresponding to respective ones of a plurality of browser types; and storing the one or more additional images in the data storage.

Clause 9: The method of any one of Clauses 1-8, wherein the API is configured to receive requests from and send responses to a content delivery network (CDN).

Clause 10: The method of any one of Clauses 1-9, wherein the data storage comprises a plurality of images optimized for one or more respective browsers that are generated by the image processing component of the API.

Clause 11: A processing system, comprising means for performing a method in accordance with any one of Clauses 1-10.

Clause 12: A non-transitory computer-readable medium comprising computer-executable instructions that, when executed by a processor of a processing system, cause the processing system to perform a method in accordance with any one of Clauses 1-10.

Clause 13: A computer program product embodied on a computer-readable storage medium comprising code for performing a method in accordance with any one of Clauses 1-10.

Additional Considerations

The description provided above is intended to be illustrative and non-limiting. Thus, it will be apparent to one skilled in the art that modifications may be made to the present disclosure as described without departing from the scope of the claims set out below. Moreover, while the above description was provided with reference to the creation of enhanced documents and online documents, the disclosure is not thus limited, and may be naturally extended to other contexts.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

While various aspects of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary aspects, but should be defined only in accordance with the following claims and their equivalents.

What is claimed is:

1. A method for image optimization, comprising:

receiving, via an application programming interface (API), a first request for an image, wherein the first request comprises a cache key for the image, and the cache key comprises an image uniform resource locator (URL) and a header;

in response to receiving the first request, querying, with the API, a data storage for the image based on the cache key;

receiving a query response that indicates the image corresponding to the cache key is not in the data storage;

in response to receiving the query response that indicates the image corresponding to the cache key is not in the data storage:

retrieving, based on receipt of the query response, an original image of the image indicated by the first request;

sending, from the API, a first response to the first request, wherein the first response comprises an interim image and an image expiration time for the interim image;

converting, with an image processing component, the original image to an optimized image, wherein the optimized image comprises a format and dimensions corresponding to the image URL and the header of the cache key; and storing the optimized image in the data storage;

receiving, via the API after the image expiration time has passed, a second request for the image, wherein the second request comprises the cache key for the image;

in response to receiving the second request, querying, with the API, the data storage for the image based on the cache key of the second request; and sending, from the API, a second response to the second request, wherein the second response comprises the optimized image, based on the cache key of the second request.

2. The method of claim 1, wherein:

converting the original image to the optimized image comprises converting the original image comprising a first format to the optimized image comprising a second format, the second format is different from the first format, and the second format is one of: an AV1 Image File Format (AVIF), a Web Picture (WebP) format, a Portable Network Graphic (PNG) format, or a Joint Photographic Experts Group (JPEG or JPG) format.

3. The method of claim 1, wherein the image URL indicates an image address and the dimensions of the image.

4. The method of claim 1, further comprising determining the format of the image based on the header, wherein querying, with the API, the data storage for the image further comprises searching for the image in the determined format.

5. The method of claim 4, wherein:

the format of the image is compatible with a browser type indicated by the header, and the browser type corresponds to a browser that sent the first request.

6. The method of claim 1, wherein converting, with the image processing component, the original image to the optimized image comprises at least one of:

converting the original image comprising a first format to the optimized image comprising a second format, or converting the original image comprising first dimensions to the optimized image comprising second dimensions.

7. The method of claim 1, further comprising:

extracting, via the API, a first image from the data storage based on the querying of the data storage for the image based on the cache key, wherein at least one of an image format or one or more image dimensions of the first image match the format or dimensions corresponding to the image URL and the header of the cache key; and determining that the interim image is either the original image or the first image based on a comparison of respective file sizes of the original image and the interim image, wherein the interim image is one of the original image or the first image comprising a smaller file size.

8. The method of claim 1, further comprising:

receiving one or more original images;

converting, with the image processing component, the one or more original images to one or more additional images, wherein each of the one or more additional images are formatted and dimensioned corresponding to respective ones of a plurality of browser types; and storing the one or more additional images in the data storage.

9. The method of claim 1, wherein the API is configured to receive requests from and send responses to a content delivery network (CDN).

10. The method of claim 1, wherein the data storage comprises a plurality of images optimized for one or more respective browsers that are generated by the image processing component of the API.

11. A processing system, comprising:

one or more memories comprising computer-executable instructions; and one or more processors configured to execute the computer-executable instructions causing the processing system to:

receive, via an application programming interface (API), a first request for an image, wherein the first request comprises a cache key for the image, and the cache key comprises an image uniform resource locator (URL) and a header;

in response to receipt of the first request, query, with the API, a data storage for the image based on the cache key;

receive a query response that indicates the image corresponding to the cache key is not in the data storage;

in response to receipt of the query response that indicates the image corresponding to the cache key is not in the data storage:

retrieve an original image of the image indicated by the first request;

send, from the API, a first response to the first request, wherein the first response comprises an interim image and an image expiration time for the interim image;

convert, with an image processing component, the original image to an optimized image, wherein the optimized image comprises a format and dimensions corresponding to the image URL and the header of the cache key; and store the optimized image in the data storage;

receive, via the API at a time after the image expiration time, a second request for the image, wherein the second request comprises the cache key for the image;

in response to receipt of the second request, query, with the API, the data storage for the image based on the cache key of the second request; and send, from the API, a second response to the second request, wherein the second response comprises the optimized image based on the cache key.

12. The processing system of claim 11, wherein the computer-executable instructions causing the processing system to convert the original image to the optimized image cause the processing system to convert the original image comprising a first format to the optimized image comprising a second format, wherein:

the second format is different from the first format, and the second format is one of: an AV1 Image File Format (AVIF), a Web Picture (WebP) format, a Portable Network Graphic (PNG) format, or a Joint Photographic Experts Group (JPEG or JPG) format.

13. The processing system of claim 11, wherein the image URL indicates an image address and the dimensions of the image.

14. The processing system of claim 11, wherein the computer-executable instructions further cause the processing system to determine the format of the image based on the header, wherein querying, with the API, the data storage for the image further comprises searching for the image in the determined format.

15. The processing system of claim 14, wherein:

the format of the image is compatible with a browser type indicated by the header, and the browser type corresponds to a browser that sent the first request.

16. The processing system of claim 11, the computer-executable instructions causing the processing system to convert, with the image processing component, the original image to the optimized image comprises causing the processing system to:

convert the original image comprising a first format to the optimized image comprising a second format, or convert the original image comprising first dimensions to the optimized image comprising second dimensions.

17. The processing system of claim 11, wherein the computer-executable instructions further cause the processing system to:

extract, via the API, a first image from the data storage based on the querying of the data storage for the image based on the cache key, wherein at least one of an image format or one or more image dimensions of the first image match the format or dimensions corresponding to the image URL and the header of the cache key; and determine that the interim image is either the original image or the first image based on a comparison of respective file sizes of the original image and the interim image, wherein the interim image is one of the original image or the first image comprising a smaller file size.

18. The processing system of claim 11, wherein the computer-executable instructions further cause the processing system to:

receive one or more original images;

convert, with the image processing component, the one or more original images to one or more additional images, wherein each of the one or more additional images are formatted and dimensioned corresponding to respective ones of a plurality of browser types; and store the one or more additional images in the data storage.

19. The processing system of claim 11, wherein the API is configured to receive requests from and send responses to a content delivery network (CDN).

20. The processing system of claim 11, wherein the data storage comprises a plurality of images optimized for one or more respective browsers that are generated by the image processing component of the API.

* * * * *